US 8,014,339 B1

(12) United States Patent
Moore

(10) Patent No.: US 8,014,339 B1
(45) Date of Patent: Sep. 6, 2011

(54) METHODS FOR PROVIDING UNIVERSAL NETWORK ACCESS WITHIN A WIRELESS COMMUNICATION SYSTEM

(75) Inventor: David Moore, Riverton, UT (US)

(73) Assignee: Hewlett-Packard Company, Palo Alto, CA (US)

( * ) Notice: Subject to any disclaimer, the term of this patent is extended or adjusted under 35 U.S.C. 154(b) by 2051 days.

(21) Appl. No.: 10/374,826

(22) Filed: Feb. 25, 2003

(51) Int. Cl.
  *H04W 4/00* (2009.01)
(52) U.S. Cl. ......... 370/328; 370/229; 370/401; 370/466
(58) Field of Classification Search .................. 370/229, 370/401, 328, 277, 278, 310.2, 466; 455/73, 455/41.2, 41.3, 414.1, 426.1
See application file for complete search history.

(56) References Cited

U.S. PATENT DOCUMENTS

| | | | | |
|---|---|---|---|---|
| 6,591,382 | B1* | 7/2003 | Molloy et al. ................ | 714/704 |
| 7,039,358 | B1* | 5/2006 | Shellhammer et al. ....... | 455/41.2 |
| 7,046,649 | B2* | 5/2006 | Awater et al. ................. | 370/338 |
| 7,082,461 | B2* | 7/2006 | Sharma et al. ................ | 709/220 |
| 7,194,544 | B2* | 3/2007 | Natarajan et al. ............ | 709/228 |
| 7,218,644 | B1* | 5/2007 | Heinonen et al. ............ | 370/468 |
| 7,327,981 | B2* | 2/2008 | Hundal ......................... | 455/41.2 |
| 2002/0022453 | A1* | 2/2002 | Balog et al. .................. | 455/41 |
| 2002/0090911 | A1* | 7/2002 | Evans et al. .................. | 455/41 |
| 2002/0145980 | A1* | 10/2002 | Morley et al. ................. | 370/244 |
| 2002/0196771 | A1* | 12/2002 | Vij et al. ....................... | 370/349 |
| 2003/0011467 | A1* | 1/2003 | Suomela ....................... | 340/7.1 |
| 2003/0036408 | A1* | 2/2003 | Johansson et al. ........... | 455/560 |
| 2004/0014422 | A1* | 1/2004 | Kallio ........................... | 455/41.1 |
| 2004/0042413 | A1* | 3/2004 | Kawamura et al. .......... | 370/252 |
| 2004/0048569 | A1* | 3/2004 | Kawamura ................... | 455/41.1 |
| 2004/0131078 | A1* | 7/2004 | Gupta et al. .................. | 370/466 |
| 2004/0132500 | A1* | 7/2004 | Rogalski et al. ............. | 455/569.1 |
| 2005/0063416 | A1* | 3/2005 | Shin et al. .................... | 370/465 |
| 2005/0176473 | A1* | 8/2005 | Melpignano .................. | 455/574 |
| 2005/0261007 | A1* | 11/2005 | Van Valkenburg ........... | 455/466 |
| 2005/0286466 | A1* | 12/2005 | Tagg et al. .................... | 370/329 |

OTHER PUBLICATIONS

Bluetooth Network Encapsulation Protocol Specification, Jun. 12, 2001.*
Personal Area Networking Profile, Feb. 14, 2003.*
Bluetooth Network Encapsulation Protocol (BNEP) Specfication, Revision .95a, Jun. 12, 2001.*

* cited by examiner

*Primary Examiner* — Kwang B Yao
*Assistant Examiner* — Nguyen Ngo

(57) ABSTRACT

A wireless network access point that is compatible with multiple wireless network access profiles. The wireless network access point of the present invention allows devices with heterogeneous wireless network access profiles to access the network over the same network access point (NAP). This enables existing networks to upgrade NAPs without being forced to upgrade all the wireless devices within the network. In addition, the NAP of the present invention enables wireless devices to utilize network access profile features available in network access profiles other than the one loaded on the wireless device itself.

18 Claims, 4 Drawing Sheets

METHODS FOR PROVIDING UNIVERSAL NETWORK ACCESS WITHIN A WIRELESS COMMUNICATION SYSTEM

BACKGROUND OF THE INVENTION

1. The Field of the Invention

This invention relates generally to the field of wireless communication software. In particular, embodiments of the present invention relate to a method of providing universal network access within a wireless system.

2. The Relevant Technology

Short range wireless communication schemes are increasingly used as an alternative to wire-based networks to interconnect computers and computer devices. The use of wireless communications provides a number of advantages, including the elimination of complex, expensive, and inconvenient wire-based connection schemes. While a number of wireless communications standards have been developed for such applications, one popular example is known as "Bluetooth." The Bluetooth standard uses low power radio frequencies to allow communication between various devices such as mobile phones, laptop and desktop computers, printers, modems, PDAs, etc. This technology was originally envisioned for the purpose of replacing cabling and other hard-wired connection schemes used to connect auxiliary devices to a desktop or laptop computer. However, Bluetooth has further evolved into a method of sending both data and voice signals between a wide range of devices. For example, a Bluetooth-enabled PDA could be configured to automatically connect to a Bluetooth-enabled communications line within a building, therefore gaining wireless access to computing resources, such as printers, an Internet portal, etc.

In an effort to ensure compatibility among Bluetooth implementations, a Bluetooth special interest group (SIG) was formed. One of the main objectives of the Bluetooth SIG is to formulate a standardized specification for every element of Bluetooth. The specification dictates numerous software and hardware characteristics so that devices made by different manufacturers will be compatible with one another. The specification dictates all aspects of Bluetooth technology from the software stack necessary to run Bluetooth devices to the actual hardware requirements.

As per this standard, Bluetooth compatible technology is composed of multiple components that together provide for wireless communication capabilities. For example, each Bluetooth-compatible device is configured with a radio that can transmit and receive wireless signals on a particular frequency band. In addition, there are certain structural elements required for connecting the radio to the specific host device. Further, each Bluetooth-compatible device is also configured with particular software to allow the device to properly process and route data or voice signals. This software is typically referred to as the "protocol stack" because it is composed of numerous components that are each configured to perform a particular function. Information is generally passed between the respective layers of the stack either from the bottom of the stack to the top or vice versa. The protocol stack is further broken up into a "transport protocol group," a "middleware protocol group" and an "application protocol group.

In general, the transport protocol group is designed to allow Bluetooth devices to locate one another within a Bluetooth network, and to manage the links that allow higher layer protocols and applications to pass data through the transport protocols. The transport protocol group is comprised of a radio, a baseband controller, a link manager, a logical link control and adaptation protocol (L2CAP), and a host controller interface (HCI). The baseband controller defines how devices search for one another and how they connect to one another. The baseband controller also defines the master and slave roles between devices. The link manager supervises the creation of pairing between devices and the encryption of data. The link manager also supervises power control among devices. For example, the link manager can initiate a low power adjustment between devices to conserve energy. The L2CAP supports the protocol multiplexing that allows multiple protocols to utilize the same air-interface. It also maintains the desired level of service among devices. The HCI allows higher layers of the stack to access the baseband controller and link manager. The HCI is not a required part of the Bluetooth specification. The radio, link manager and baseband controller are sometimes grouped together to form what is referred to as a Bluetooth module. The remaining components of the transport layer are typically located on the actual Bluetooth host device.

The middleware protocol group is directed to functionality that facilitates communication between host applications and the Bluetooth module. The protocols can include both third-party protocols and industry standard protocols specified by the Bluetooth SIG. The middleware protocol group specifically includes a RFCOMM, a service discovery protocol (SDP), a set of IrDa interoperability protocols, and a telephony control protocol (TCS). The RFCOMM protocol creates virtual serial ports to facilitate the replacement of cables with a wireless Bluetooth interface. The SDP protocol defines a standard method for Bluetooth devices to discover and learn about the services offered by other Bluetooth devices within the network. The set of IrDa interoperability protocols helps to define the syntax of the data to be exchanged between devices. The TCS protocol is designed to control the exchange of voice communications between devices.

The application protocol group consists of the various applications that utilize Bluetooth communications. The applications may be unaware that data is being transmitted over a Bluetooth air-interface rather than a standard cable, or the application may be specifically designed to interact with Bluetooth devices.

Bluetooth devices form what are known as "piconets" with one another. A piconet is comprised of one Bluetooth device acting as a master and numerous other devices acting as slaves. Both the master and the slave devices can transmit and receive data from one another. However, the master device defines the data hopping sequence and is usually the device that initiates the communication. Initiation of a communication depends, in part, on the configuration state of a device. For example, an "active state" is a system configuration in which the slave device is always listening for transmissions from the master. In a "parked state" the slave device is only periodically listening to the master. Thus, a parked slave must become active before it can communicate normally with the master. In addition, there is a sniff state and a hold state, both of which are considered active states. The sniff and hold states are used as alternatives to the full active state for the purpose of conserving power. A slave device in a sniff mode essentially communicates with the master at regular intervals rather than always listening. A slave device in a hold mode essentially stops listening to the master for a specified period of time.

There are several limitations present in the Bluetooth standard that can degrade the overall operating efficiency of a Bluetooth network. A primary limitation relates to the number of active slave devices that can be connected within a single piconet. Up to seven active slave devices and up to 255 parked slave devices can be linked to a master device in a single piconet at a given time. The seven device limitation prevents the master from actively communicating with more than seven slave devices at any given time. This device limitation is mandated by the physical bandwith characteristics of Bluetooth devices. Obviously, the seven device limitation can limit the functionality that is available to a master device at any given time, which may in turn severely limit the operating efficiency of the Bluetooth network.

For example, if an application needs to establish a communication link with the Internet, it may request a Bluetooth-connection with a Bluetooth enabled modem. However, if the modem is attached to one of the parked Bluetooth slave devices (i.e., not available as one of the seven active devices), it may take a relatively long amount of time before the parked device becomes active and actually processes the request from the application. This time delay is obviously undesirable.

In addition, one Bluetooth device may be part of multiple piconets. For example, the master of one piconet may also be a slave in another piconet. In this scenario, a slave device from one piconet could order a "print" command. That print command could be routed through the master to a slave which happens to be a master of another piconet that contains a printer. That second master will then send the signal to the printer. However, this type of situation could severely limit the bandwidth of the second master as it is routing the print command (and associated print data) to the printer, thereby limiting its ability to respond to other requests within its piconet. Again, this problem is in large part a result of the seven device limitation.

The Bluetooth wireless standard can also be used to wirelessly connect devices to existing networks. For example, a Bluetooth equipped PDA could utilize a printer of an existing LAN network by establishing a wireless connection with the LAN network. Generally, a network access point (NAP) is used to provide wireless network access to devices. A NAP is a Bluetooth enabled device that is directly connected to the network. The NAP contains the Bluetooth protocol such that it can decode and encode data packets that are passed to and from the network and the one or more devices wirelessly connected to the network. Originally, only the LAN access profile enabled devices to wirelessly communicate with a network. Recently, a Personal Area Networking (PAN) access profile has also been developed that enables devices to wirelessly communicate with a network. More specifically, the PAN profile describes how two or more Bluetooth enabled devices can form an ad-hoc network and how to access a remote network through a NAP. However, with the addition of the PAN access profile, there is the potential for problems with compatibility when devices equipped with the PAN access profile attempt to connect to a network via a NAP that is only equipped with the LAN access profile. It would also be undesirable if a LAN access profile NAP is replaced with a PAN access profile NAP which then forces all existing LAN access profile compatible devices to be replaced with PAN access profile devices.

Therefore, there is a need for a network access point that is compatible with multiple network access profiles.

BRIEF SUMMARY OF EMBODIMENTS OF THE INVENTION

These and other problems in the prior art are addressed by embodiments of the present invention, which relates to a wireless network access point that is compatible with multiple wireless network access profiles. The wireless network access point of the present invention allows devices with heterogeneous wireless network access profiles to access the network over the same network access point (NAP). This enables existing networks to upgrade NAPs without being forced to upgrade all the wireless devices within the network. In addition, the NAP of the present invention enables wireless devices to utilize network access profile features available in network access profiles other than the one loaded on the wireless device itself.

In one presently preferred Bluetooth embodiment, the Bluetooth NAP provides access via both a LAN access profile and a PAN access profile. This compatibility is provided by adding the Bluetooth Network Encapsulation Protocol (BNEP) to the middleware protocol group of the Bluetooth protocol stack of the NAP. The BNEP allows PAN access profile data packets to be encapsulated for use with an IP data channel. The RFCOMM protocol allows LAN access profile data packets to utilize a PPP channel for data communications. Incoming data packets are passed through the lower levels of the Bluetooth protocol stack and then to the L2CAP. The L2CAP module routes data packets to the proper protocol. For example, incoming PAN access profile data packets are routed to the BNEP for use with an IP data channel, while incoming LAN access profile data packets are routed to the RFCOMM for use with a PPP data channel.

In addition to allowing network access to multiple network access profiles, the presently preferred Bluetooth NAP enables group node features between both PAN access profile devices and LAN access profile devices. Group node features allow individual devices connected to the NAP to communicate directly. For example, a LAN access profile device connected to the NAP can utilize this group node feature to directly communicate with another LAN or PAN access profile device that is also connected to the NAP.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and features of the invention are obtained, a more particular description of the invention briefly described above will be given by making reference to a specific embodiment that is illustrated in the appended drawings. These drawings depict only one embodiment of the invention and are not to be considered limiting of its scope.

DETAILED DESCRIPTION OF THE PREFERRED EMBODIMENTS

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

In general, the present invention relates a wireless network access point that is compatible with multiple wireless network access profiles. The wireless network access point of the present invention allows devices with heterogeneous wireless network access profiles to access the network over the same network access point (NAP). This enables existing networks to upgrade NAPs without being forced to upgrade all the wireless devices within the network. In addition, the NAP of the present invention enables wireless devices to utilize network access profile features available in network access profiles other than the one loaded on the wireless device itself. Also, while embodiments of the present invention are described in the context of a Bluetooth network access point, it will be appreciated that the teachings of the present invention are applicable to other applications as well. For example, a similar method could be used for 802.11 or UWB wireless networks.

Figure 1:
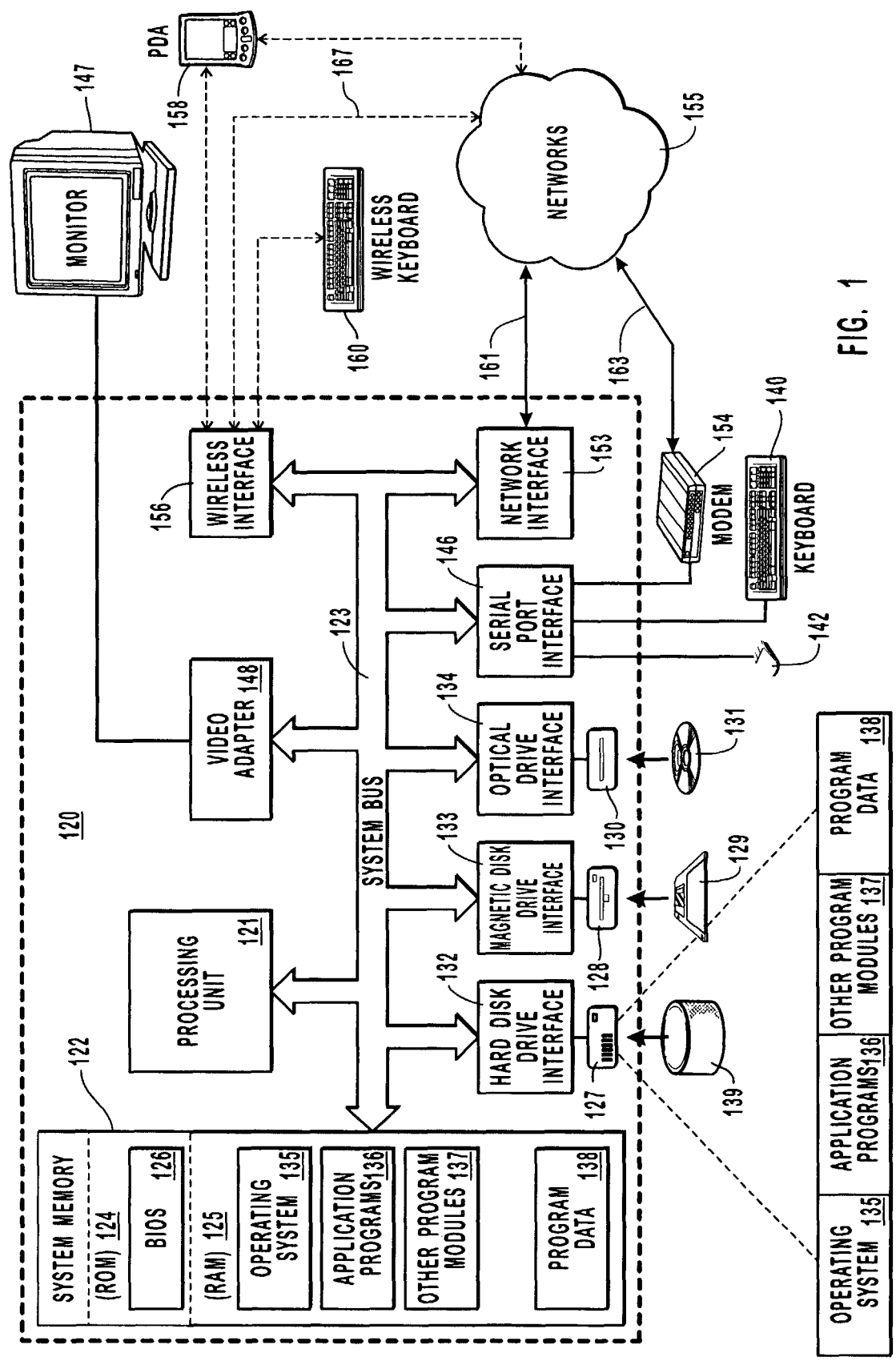
FIG. 1 illustrates an example processing system that provides a suitable operating environment for the present invention.

FIG. 1 and the following discussion are intended to provide a brief, general description of an example of a suitable computing environment in which embodiments of the present invention may be implemented. Although not required, embodiments of the invention may be described in the general context of computer-executable instructions, such as program modules, being executed by computers operating within network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that embodiments of the invention may be practiced in network computing environments with many types of computer system configurations, including personal computers, hand-held devices, mobile telephones, personal digital assistants ("PDAs"), multi-processor systems, microprocessor-based or programmable consumer electronics, network PCs, minicomputers, mainframe computers, and the like. The invention may also be practiced in distributed computing environments where local and remote processing devices are linked (either by hardwired links, wireless links, or by a combination of hardwired or wireless links) through a communications network and both the local and remote processing devices perform tasks.

With reference to FIG. 1, an example system for implementing embodiments of the invention includes a general-purpose computing device, one example of which is shown in the form of a conventional computer 120. Computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and/or an optical disk drive 130 for reading from or writing to removable optical disk 131 such as a CD-ROM or other optical media. In this particular example, the magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Of course, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 and/or RAM 125. Examples include an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a wireless interface, a parallel port, a game port, a universal serial bus (USB) and the like. A monitor 147 or another display device is also connected to system bus 123 via an interface, such as video adapter 148. In addition to the monitor, some computers may include other peripheral output devices (not shown), such as speakers and printers.

The computer 120 may be operatively connected to a networked environment, an example of which is designated in FIG. 1 as network 155. As is well known, network 155 may be used to connect computer 120 to other remote computers, which may be personal computers, servers, routers, network PCs, peer devices or other common network nodes, and typically include many or all of the elements described above relative to the computer 120. Examples of various logical connections to network 155 are depicted in FIG. 1 include a wireless network 167, a local area network (LAN) 161, and a wide area network (WAN) 163. Each of the logical connections 167, 161, 163 represent a different way for the computer 120 to connect to the network 155. The wireless network 167 may utilize radio frequencies, microwaves, infrared light, etc. to transmit signals via the wireless interface 156 to the network 155. The LAN 161 utilizes, for example, an Ethernet, a USB network, or a token ring network to transmit signals from the network interface 153 to the network 155. The WAN 163 utilizes a modem 154 to decode the signals and a standard telephone line, wireless telephone line, coaxial cable, or fiber optic cable to transmit the signals from the serial port interface 146 to the networks 155. Such networking environments are commonplace in office-wide or enterprise-wide computer networks, intranets and the Internet.

By way of example, the wireless interface 156 could be implemented as a short range radio transceiver that preferably utilizes low power radio frequencies to transmit information over relatively short distances. For example, the wireless interface could be implemented as a Bluetooth or an 802.11 transceiver module. In this way, the wireless interface 156 could be used to wirelessly connect the computer 120 to a wide range of external devices, computing devices, networks, etc. For example, a Bluetooth module may be connected to the computer 120 to allow for a wireless connection between the computer 120 and a PDA 158 similarly equipped with a Bluetooth module. In addition, the wireless interface 156 can connect to devices that typically use other interfaces when communicating with the computer 120. For example, keyboards are typically connected to the computer 120 via the serial port interface 146, but may also be connected with a Bluetooth module. To do so, the wireless interface 156 typically includes a protocol that is capable of emulating a standard interface communication sequence, such as a serial port. For example, in a Bluetooth system, the RFCOMM protocol can be used to create virtual serial ports so that serial devices can be wirelessly connected to the computer 120 via the wireless interface 156 without extensive manipulation of existing software drivers, application software, etc.

For purposes of illustration, wireless transceiver module 156 in FIG. 1 is implemented as a Bluetooth compatible wireless transceiver or radio. As previously discussed, a Bluetooth transceiver device 156 is configured with a radio that can transmit and receive signals on a particular frequency band. In addition, the device is typically programmable, and is configured with software to process and route wireless signals. This software is implemented as a protocol stack, which is comprised of functional components that are organized within adjacent layers to form a logical stack. Also, depending on the implementation scheme, certain of the components of the stack reside within the host device (such as computer 120) memory and are executed by the host processor (121 in FIG. 1), and other components of the stack are stored and executed at the Bluetooth module itself (e.g., 156 in FIG. 1).

Figure 2:
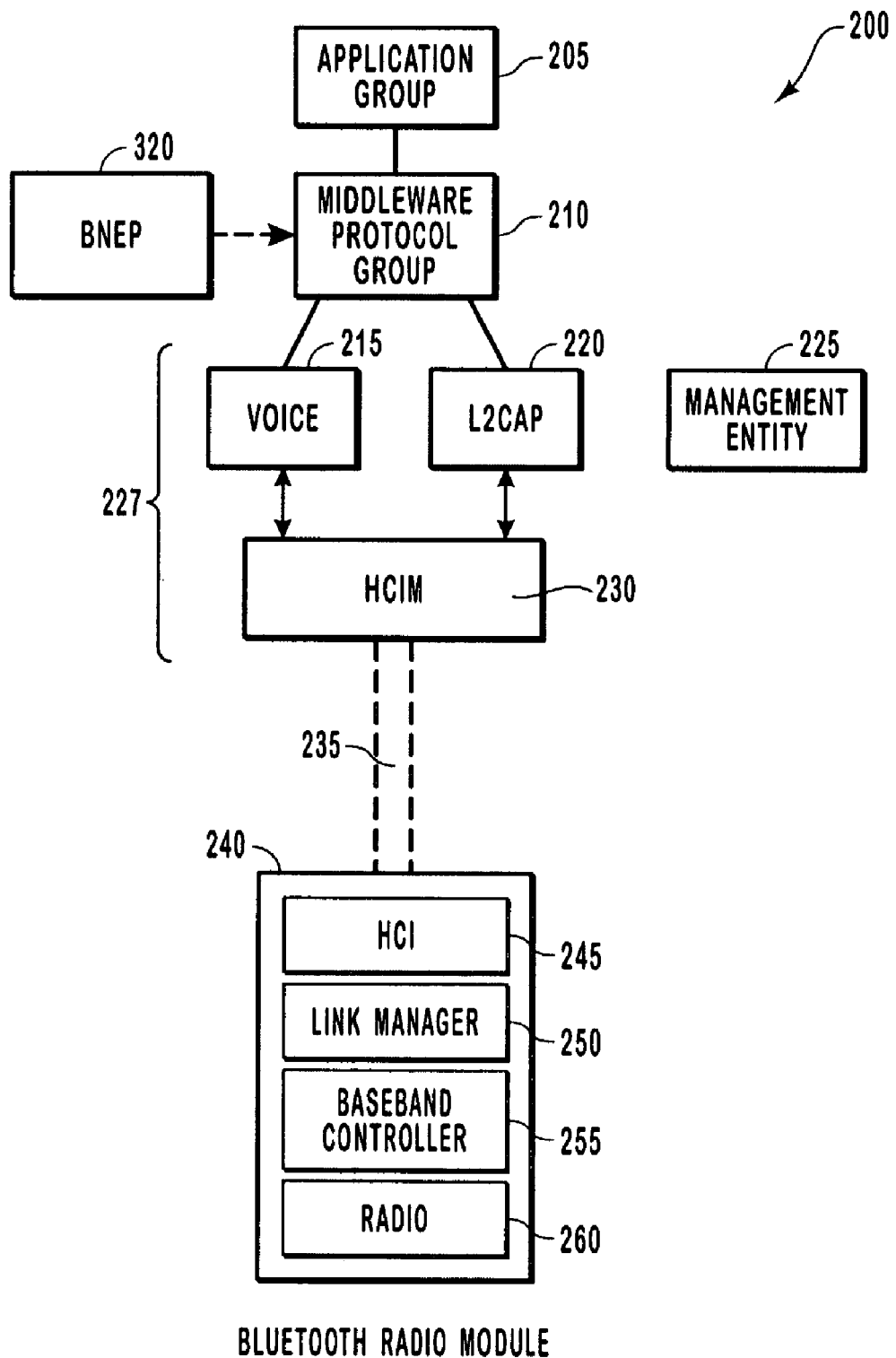
FIG. 2 illustrates a simplified functional block diagram of a standard Bluetooth protocol stack.

Reference is next made to FIG. 2 which illustrates a simplified functional block diagram of a standard Bluetooth host-based protocol stack, designated generally at 200. As will be discussed further, the stack implementation has been modified in a manner so as to permit it to be used in a network access point (NAP) to provide access to both LAN access profile devices and PAN access profile devices. Bluetooth is one example of a wireless standard which could be used to implement the network access point in accordance with the present invention. As noted, the illustrated protocol stack is a chart representing the various stages a command goes through to perform a particular task. For example, a text editor application may initiate a print command which then travels down through each layer of the protocol stack and across a Bluetooth wireless interface to a printer which prints the document. In the illustrated example, the protocol stack 200 is comprised of multiple sub-elements which are vertically positioned to indicate a sequence of communication. Typically, information is passed either from the bottom to the top or vice versa. The uppermost element of the protocol stack 200 is the Application Group 210. The Application Group 210 represents the higher level applications that directly interact with the user. The application often sends commands to devices that may be connected via a Bluetooth radio such as a printer, a modem, a fax, etc. The next element down in the protocol stack 200 is the Middleware Protocol Group 215. The Middleware Protocol Group 215 represents the various protocols that are used as channels between the upper Application Group 210 and the lower levels of the protocol stack 200. These protocols include TCP, TCS-BIN, PPP, etc. The applications in the Application Group 210 may use one or more of the protocols in the Middleware Protocol Group 215 to communicate with the lower levels 227 of the protocol stack 200. As is denoted in the figure, this particular implementation of the protocol stack has been modified for use in a NAP device in accordance with the present invention. In particular, the Middleware Protocol Group 215 has been modified so as to include the functionality of a Bluetooth Network Encapsulation Protocol (BNEP) 320. The inclusion of this component will be described in further detail below.

As is further shown in FIG. 2, A Host Controller Interface (HCI) 230 is located within the lower level 227 of the protocol stack 200 and within the Bluetooth module 240. The HCIs 230 245 create a standardized interface between the lower level 227 of the protocol stack 200 and the Bluetooth module 240. The standard interface is designed to allow for compatibility among Bluetooth module manufacturers. The connector 235 connects the Bluetooth radio module 240 to the lower level 227 of the protocol stack 200. The connector 235 is preferably a standard connector such as USB, serial, parallel, PC board, etc. The Bluetooth radio module 240 further comprises a HCI 245, a Link Manager 250, a Baseband Controller 255 and a Radio 260. The Link Manager 250 manages the properties of the air interface between the Bluetooth devices. The Baseband controller 255 manages how the Bluetooth devices talk to one another. And the radio 260 transmits and receives the low power radio signals across the air interface between Bluetooth devices.

As is further shown in FIG. 2, data packets are routed to either a Voice 215 element or a L2CAP 220 element depending on whether the information contains voice signals or data signals. Voice signals are sent through the Voice 215 element and data signals are sent through the L2CAP 220 element. In addition, the L2CAP element 220 is involved in further routing data signals to and from protocols in the middleware protocol group 210. The Management Entity 225 manages how the other elements perform their functions. Information is never directly sent through the Management Entity 225 but it is involved in establishing connections between devices and then managing the flow of information through each element.

Figure 3:
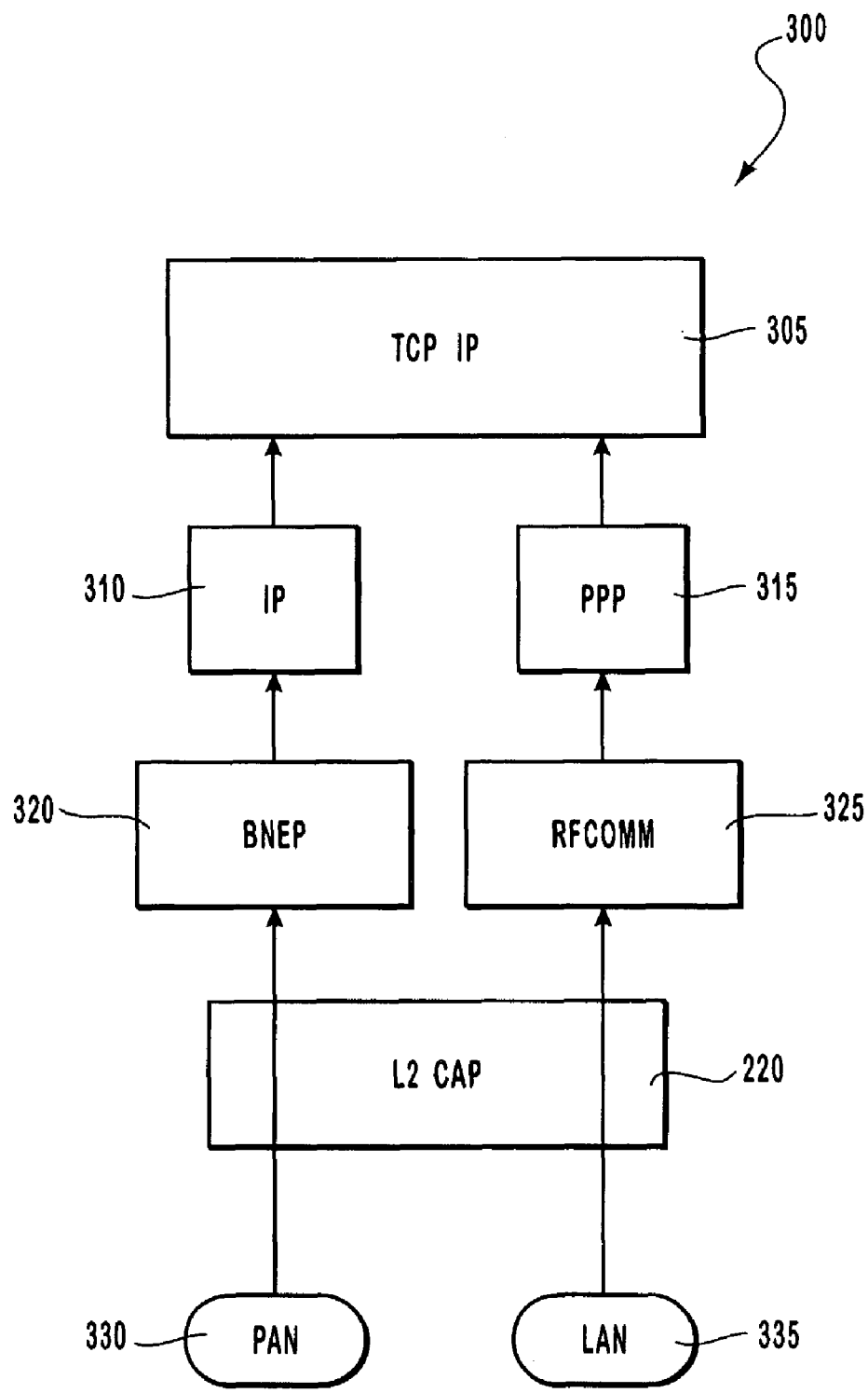
FIG. 3 illustrates a modified portion of a Bluetooth protocol stack in accordance with the presently preferred Bluetooth embodiment of the present invention, such that the protocol stack could be used to enable a network access point to provide network access to both LAN access profile devices and LAN access profile devices.

Reference is next made to FIG. 3, which illustrates in further detail the modified portion of a Bluetooth protocol stack in accordance with the presently preferred Bluetooth embodiment of the present invention. In this particular embodiment, the protocol stack could be used to enable a network access point (NAP) to provide network access to both Local Area Network (LAN) access profile devices and Personal Area Network (PAN) access profile devices, designated generally at 300. In general, a network access point (NAP) can be a device that enables wireless communications between a wireless device and a computer network, and/or a that enables wireless devices to communicate and exchange data directly with one another in the form of an ad hoc wireless network. For example, a network access point could enable a connected device to communicate with an existing wire-based LAN or to simply directly communicate with another wireless device. The portion of the Bluetooth protocol stack 300 shown in FIG. 3 is the portion of the middleware protocol group 210 shown in FIG. 2 that is primarily responsible for data packets.

With continued reference to FIG. 3, the Bluetooth Network Encapsulation Protocol (BNEP) 320 is an additional protocol that is not included in older versions of the Bluetooth protocol stack. The BNEP 320 encapsulates data packets from PAN access profile devices such that they can be transferred over an Internet Protocol (IP) channel. IP is defined and maintained by the Internet Engineering Task Force (IETF). IP is a standard data format used by many devices within the internet. Because of the widespread use of IP, it is advantageous to make Bluetooth devices compatible with this communication standard. The BNEP 320 module is positioned in the Bluetooth protocol stack parallel to the RFCOMM 325 in the middleware protocol group. The RFCOMM 325 module generally configures LAN access profile data packets for use with Point-to-Point Protocol (PPP) data channels.

In operation, the portion of the Bluetooth protocol stack illustrated in FIG. 3 accepts data packets from both LAN access profile devices 330 and PAN access profile devices 335. The data packets from either type of device are routed through the lower levels of the Bluetooth protocol stack (not shown) to the L2CAP module 220 (as shown in FIG. 2). The L2CAP module 220 routes the data packets to the appropriate protocol. If the data packets are transferred from a PAN access profile device, the L2CAP 220 routes the data packets to the BNEP 320. If the data packets are transferred from a LAN access profile device, the L2CAP 220 routes the data packets to the RFCOMM 325. The BNEP 320 module configures the data packets for use with an IP data channel 310 and then transmits them to the TCP/IP 305 over the IP data channel 310. The RFCOMM 325 configures data packets for use with a PPP data channel 15 and then transmits them to the TCP/IP 305 over the PPP data channel 315.

Figure 4:
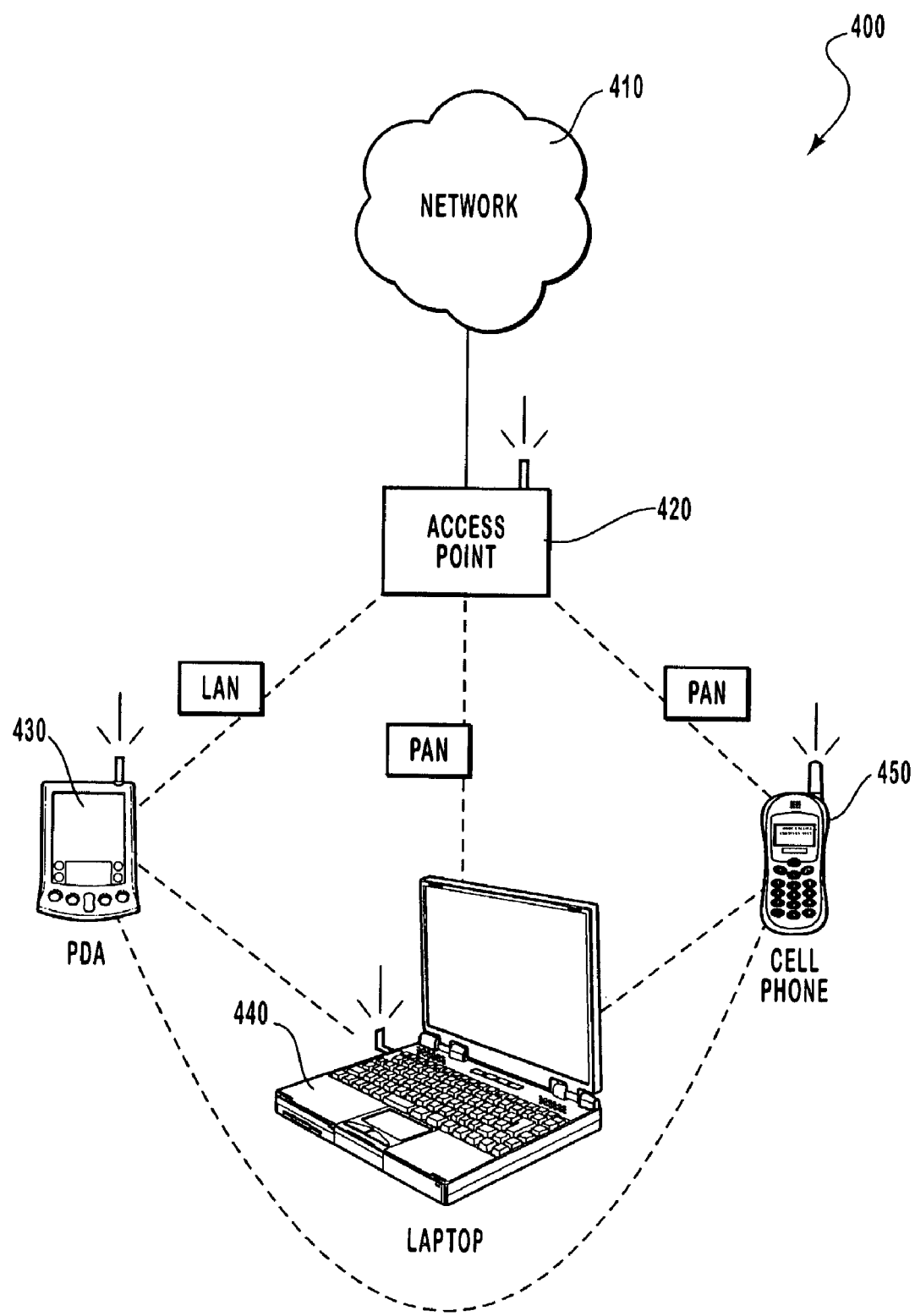
FIG. 4 illustrates a Bluetooth wireless network environment for use with one Bluetooth embodiment of the present invention.

Reference is next made to FIG. 4, which illustrates a Bluetooth wireless network environment for use with one Bluetooth embodiment of the present invention, designated generally at 400. The network access point (NAP) 420 contains a modified Bluetooth protocol stack to enable communications with both PAN access profile devices and LAN access profile devices. FIG. 3 illustrates one presently preferred modified portion of the Bluetooth protocol stack to enable the universal access among multiple network access profiles. The network access point 420 is directly connected to a network 410. The network 410 contains numerous resources such as a direct internet connection, a modem, a printer, and other devices. The NAP 420 is connected to a PDA 430, a Laptop 440 and cell phone 450 over an air interface. In this scenario the NAP is acting as both a network access manager and a group node. As a network access manager, the NAP 420 allows wireless devices to communicate directly with devices within the network 410. As a group node, the NAP 420 enables wireless devices to form networks among themselves and communicate directly.

With continued reference to FIG. 4, the illustrated NAP 420 is maintaining simultaneous wireless connections with both LAN access profile devices and PAN access profile devices. PDA 430 utilizes a LAN access profile to communicate with the NAP 420 while Laptop 440 and Cell Phone 450 utilize a PAN access profile to communicate with the NAP 420. Because of the wireless connection to the NAP 420, each of the wireless devices 430 440 450 can communicate directly with devices within the network. For example, PDA 430 could print a document on a printer located within the network 410. To allow this functionality, the NAP 420 is acting as a network access manager in routing and converting wireless signals into electrical signals for use in the wired network 410. In addition, the NAP 420 must route and convert wired signals from the network 410 that are intended for one of the wireless devices 430 440 450. For example, if the PDA 430 is attempting to print a document on a printer within the network 410, the printer would need to send information to the PDA 430 regarding the printing status of the document.

The NAP 420 illustrated in FIG. 4 is also performing wireless functions as a group node. A group node is a wireless device that allows connected wireless devices to form networks among themselves and communicate directly. Originally this feature was only available to PAN access profile devices but the NAP 420 configured with a modified Bluetooth protocol stack is able to provide this feature to all connected devices. Both PAN access profile devices and LAN access profile devices that are connected to a group node are able to directly communicate with one another and exchange data. For example, PDA 430 could directly transmit an email document to cell phone 450 because they are both connected to NAP 420 which can act as a group node.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A wireless network access point comprising:
    a radio frequency communication (RFCOMM) protocol to decode and route wireless data signals from a local area network (LAN) access profile to a computer network over a point-to-point protocol (PPP) data channel;
    a Bluetooth network encapsulation protocol (BNEP) to decode and route wireless data signals from a personal area network (PAN) access profile to the computer network over an Internet Protocol (IP) channel;
    a transceiver transmitting and receiving wireless data signals from both a PAN access profile device and a LAN access profile device, operating simultaneously; and
    a logical link control and adaptation protocol (L2CAP) module to route data packets to one of the RFCOMM protocol and the BNEP protocol based upon an access profile of the data packets.

2. The wireless network access point of claim 1, wherein the BNEP protocol decodes the PAN wireless data signals, encapsulates data packets of the PAN wireless data signals, and transmits the data packets over the IP data channel.

3. The wireless network access point of claim 1, wherein the L2CAP module allows both the PAN access profile device and the LAN access profile device to connect to the computer network.

4. The wireless network access point of claim 1, wherein the L2CAP module allows both the PAN access profile device and the LAN access profile device to directly communicate and exchange data between one another.

5. A Bluetooth network access point comprising:
    a radio frequency communication (RFCOMM) protocol to decode and route Bluetooth data signals from a local area network (LAN) access profile to a computer network over a point-to-point protocol (PPP) data channel;
    a Bluetooth network encapsulation protocol (BNEP) to decode and route Bluetooth data signals from a personal area network (PAN) access profile to the computer network over an Internet Protocol (IP) channel;
    a transceiver transmitting and receiving Bluetooth data signals from both a PAN access profile device and a LAN access profile device, operating simultaneously; and
    a logical link control and adaptation protocol (L2CAP) module to route data packets to one of the RFCOMM protocol and the BNEP protocol based upon an access profile of the data packets.

6. The Bluetooth network access point of claim 5, wherein the RFCOMM protocol decodes the LAN Bluetooth data signals and transmits them over the PPP data channel.

7. The Bluetooth network access point of claim 5 wherein the BNEP protocol decodes the PAN Bluetooth data signals, encapsulates data packets of the PAN wireless data signals, and transmits the data packets over the IP data channel.

8. The Bluetooth network access point of claim 5, wherein the L2CAP module allows both the PAN access profile device and the LAN access profile device to connect to the computer network.

9. The Bluetooth network access point of claim 5, wherein the L2CAP module allows both the PAN access profile device and the LAN access profile device to directly communicate and exchange data between one another.

10. A method for providing universal wireless network access to a computing device comprising:
- receiving a wireless data signal from a device;
- identifying an access profile type of the wireless data signal from a plurality of simultaneously operating profiles;
- selecting a protocol that is capable of decoding the identified access profile type;
- routing the wireless data signal by a logical link control and adaptation protocol (L2CAP) module to the selected protocol such that the selected protocol creates a decoded data signal; and
- transmitting the decoded data signal to a computer network, wherein the protocol includes a radio frequency communication (RFCOMM) Bluetooth protocol and a Bluetooth network encapsulation protocol (BNEP) Bluetooth protocol, and wherein transmitting the decoded data signal further comprises transmitting the decoded data signal over a point-to-point protocol (PPP) data channel in response to the selected protocol including the RFCOMM Bluetooth protocol and transmitting the decoded data signal over an Internet Protocol (IP) data channel in response to the selected protocol including the BNEP Bluetooth protocol.

11. A non-transitory computer-readable medium embedded with computer-executable instructions for performing steps comprising:
- receiving a wireless data signal from a device;
- identifying an access profile type of the wireless data signal from a plurality of simultaneously operating profiles;
- selecting a protocol that is capable of decoding the identified access profile type;
- routing the wireless data signal by a logical link control and adaptation protocol (L2CAP) module to the selected protocol such that the selected protocol creates a decoded data signal; and
- transmitting the decoded data signal to a computer network, wherein the protocol includes a radio frequency communication (RFCOMM) Bluetooth protocol and a Bluetooth network encapsulation protocol (BNEP) Bluetooth protocol, and wherein transmitting the decoded data signal further comprises transmitting the decoded data signal over a point-to-point protocol (PPP) data channel in response to the selected protocol including the RFCOMM Bluetooth protocol and transmitting the decoded data signal over an Internet Protocol (IP) data channel in response to the selected protocol including the BNEP Bluetooth protocol.

12. A method for providing universal Bluetooth network access to a computing device comprising:
- receiving a Bluetooth data signal from a device;
- identifying an access profile type of the Bluetooth data signal from a plurality of simultaneously operating profiles;
- selecting a protocol that is capable of decoding the identified access profile type;
- routing the Bluetooth data signal by a logical link control and adaptation protocol (L2CAP) module to the selected protocol such that the selected protocol creates a decoded data signal; and
- transmitting the decoded data signal to a computer network, wherein the protocol includes a radio frequency communication (RFCOMM) Bluetooth protocol and a Bluetooth network encapsulation protocol (BNEP) Bluetooth protocol, and wherein transmitting the decoded data signal further comprises transmitting the decoded data signal over a point-to-point protocol (PPP) data channel in response to the selected protocol including the RFCOMM Bluetooth protocol and transmitting the decoded data signal over an Internet Protocol (IP) data channel in response to the selected protocol including the BNEP Bluetooth protocol.

13. A wireless computer network comprising:
- a wire-based computer network;
- a network access point to receive and decode wireless radio frequency communication (RFCOMM) and Bluetooth network encapsulation protocol (BNEP) access profile data signals from at least two different simultaneously operating types of Bluetooth access profile devices, wherein the network access point comprises a logical link control and adaptation protocol (L2CAP) module that routes decoded wireless data signals to the wire-based computer network over a point-to-point (PPP) data channel when the wireless data signals are from a personal area network (PAN) access profile device and over an Internet Protocol (IP) channel when the wireless data signals are from a local area network (LAN) access device;
- a first wireless device with the PAN access profile, wherein the first wireless device is in wireless data communication with the network access point; and
- a second wireless device with the LAN access profile, wherein the second wireless device is in wireless data communication with the network access point.

14. The wireless computer network of claim 13, wherein the wire-based computer network is a local area Ethernet network.

15. The wireless computer network of claim 13, wherein the network access point enables connected wireless devices to communicate and exchange data with one another directly.

16. A Bluetooth computer network comprising:
- a wire-based computer network;
- a network access point to receive and decode radio frequency communication (RFCOMM) and Bluetooth network encapsulation protocol (BNEP) access profile data signals from at least two different simultaneously operating types of Bluetooth access profile devices, wherein the network access point includes a logical link control and adaptation protocol (L2CAP) module that routes decoded Bluetooth data signals to the wire-based computer network over a point-to-point (PPP) data channel when the wireless data signals are from a personal area network (PAN) access profile device and over an Internet Protocol (IP) channel when the wireless data signals are from a local area network (LAN) access device;
- a first Bluetooth device with the PAN access profile, wherein the first Bluetooth device is in Bluetooth data communication with the network access point; and
- a second Bluetooth device with the LAN access profile, wherein the second Bluetooth device is in Bluetooth data communication with the network access point.

17. The Bluetooth computer network of claim 16, wherein the wire-based computer network is a local area Ethernet network.

18. The Bluetooth computer network of claim 16, wherein the network access point enables connected Bluetooth devices to communicate and exchange data with one another directly.

* * * * *

UNITED STATES PATENT AND TRADEMARK OFFICE
CERTIFICATE OF CORRECTION

PATENT NO. : 8,014,339 B1  
APPLICATION NO. : 10/374826  
DATED : September 6, 2011  
INVENTOR(S) : David Moore Page 1 of 1

It is certified that error appears in the above-identified patent and that said Letters Patent is hereby corrected as shown below:

In column 5, line 59, delete "bus using" and insert -- bus, and a local bus using --, therefor.

Signed and Sealed this
Nineteenth Day of February, 2013

Teresa Stanek Rea
*Acting Director of the United States Patent and Trademark Office*